United States Patent
Kakita et al.

(10) Patent No.: US 12,198,742 B2
(45) Date of Patent: Jan. 14, 2025

(54) DUMMY SUBSTRATE AND MANUFACTURING METHOD THEREOF

(71) Applicant: SHOWA DENKO K.K., Tokyo (JP)

(72) Inventors: Sunao Kakita, Oyama (JP); Takahiro Kushino, Oyama (JP); Hidenori Inada, Oyama (JP)

(73) Assignee: RESONAC HARD DISK CORPORATION, Chiba (JP)

( * ) Notice: Subject to any disclaimer, the term of this patent is extended or adjusted under 35 U.S.C. 154(b) by 0 days.

(21) Appl. No.: 18/165,363

(22) Filed: Feb. 7, 2023

(65) Prior Publication Data

US 2023/0186948 A1 Jun. 15, 2023

Related U.S. Application Data

(62) Division of application No. 17/410,589, filed on Aug. 24, 2021.

(30) Foreign Application Priority Data

Aug. 27, 2020 (JP) .................. 2020-143277

(51) Int. Cl.
   *G11B 5/73* (2006.01)
   *G11B 5/82* (2006.01)
   *G11B 5/84* (2006.01)

(52) U.S. Cl.
   CPC ............ *G11B 5/73921* (2019.05); *G11B 5/82* (2013.01); *G11B 5/8404* (2013.01)

(58) Field of Classification Search
   CPC .................................................. G11B 5/8404
   See application file for complete search history.

(56) References Cited

U.S. PATENT DOCUMENTS

| | | |
|---|---|---|
| 2006/0159964 A1 | 7/2006 | Shinya |
| 2011/0189506 A1 | 8/2011 | Mannami et al. |
| 2014/0093746 A1 | 4/2014 | Zambano et al. |
| 2014/0234667 A1* | 8/2014 | Saito .......... G11B 5/82 |
| | | 428/846.9 |
| 2021/0172050 A1 | 6/2021 | Shimizu et al. |

FOREIGN PATENT DOCUMENTS

| | | |
|---|---|---|
| CN | 102930874 A | 2/2013 |
| CN | 103400588 A | 11/2013 |
| JP | 2001-266338 A | 9/2001 |
| JP | 2003-346335 A | 12/2003 |
| JP | 2008-108397 A | 5/2008 |
| JP | 2011-049432 A | 3/2011 |
| JP | 2011-210368 A | 10/2011 |
| JP | 2012-142084 A | 7/2012 |
| JP | 2012-256389 A | 12/2012 |
| WO | 2011/062134 A1 | 5/2011 |
| WO | 2014/129633 A1 | 8/2014 |

* cited by examiner

*Primary Examiner* — Nathan T Leong
(74) *Attorney, Agent, or Firm* — Sughrue Mion, PLLC

(57) ABSTRACT

A dummy substrate is formed with a disk-shaped glass substrate having a center hole, and a magnetic recording film on an outer circumferential surface along a thickness direction of the glass substrate and an inner circumferential surface of the center hole, and a surface roughness (Ra) of one surface and the other surface of the glass substrate is in a range of 0.2 nm or more and 100 nm or less.

15 Claims, 3 Drawing Sheets

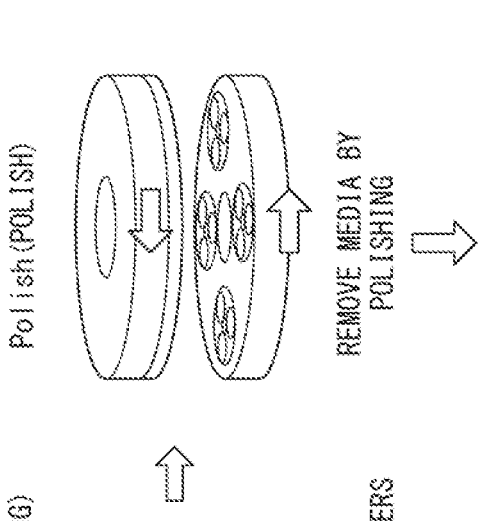
FIG. 3(a) RECEIVED FROM MEDIA FACTORY
FIG. 3(b) TS (PLATE THICKNESSES SORTING) ALIGN PLATE THICKNESSES —GROUPED EVERY 2 MICROMETERS
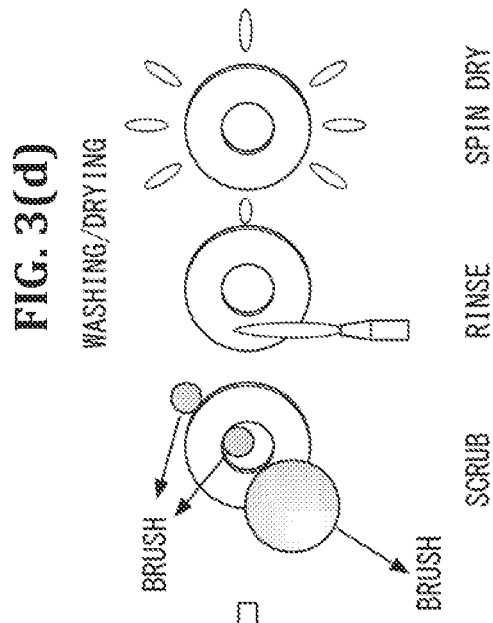
FIG. 3(c) Polish (POLISH)
REMOVE MEDIA BY POLISHING
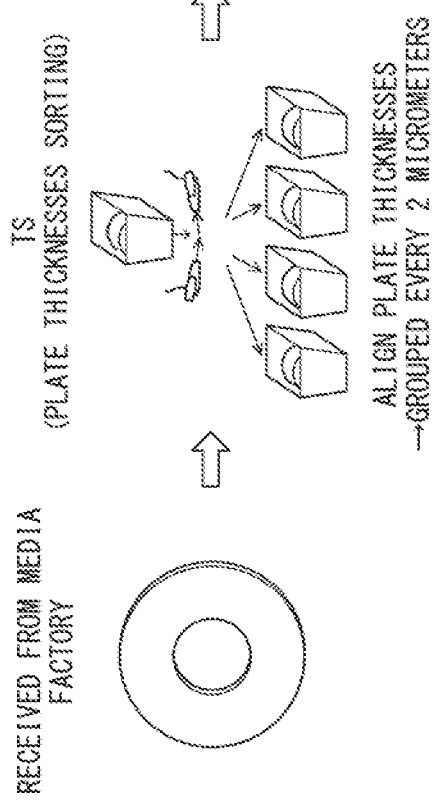
FIG. 3(d) WASHING/DRYING
SCRUB  RINSE  SPIN DRY
BRUSH
BRUSH
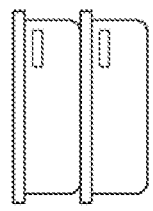
FIG. 3(e) VISUAL INSPECTION
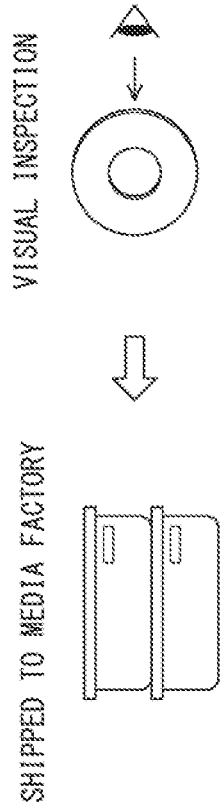
FIG. 3(f) SHIPPED TO MEDIA FACTORY

DUMMY SUBSTRATE AND MANUFACTURING METHOD THEREOF

CROSS-REFERENCE RELATED APPLICATION

This is a divisional of application Ser. No. 17/410,589 filed Aug. 24, 2021, which claims priority to Japanese Patent Application No. 2020-143277, filed Aug. 27, 2020, the content of which is incorporated herein by reference.

BACKGROUND OF THE INVENTION

Field of the Invention

The present disclosure relates to a dummy substrate used for monitoring when a magnetic recording film is formed on a glass substrate, and a manufacturing method thereof.

Description of Related Art

In recent years, a magnetic recording medium used for a hard disk drive (HDD) has been remarkably improved in recording density. In particular, since the introduction of a magneto-resistive (MR) head and partial response maximum likelihood (PRML) technology, a surface recording density of the magnetic recording medium has been significantly increased.

Moreover, in recent years, an amount of data accumulated in a data center has continued to increase due to the expansion of the use of big data. Therefore, due to a space problem of the data center, it is necessary to increase a recording capacity per unit volume of the hard disk drive in the data center. That is, in order to increase a recording capacity per standardized hard disk drive, attempts have been made to increase the number of magnetic recording media stored inside a drive case in addition to increasing a recording capacity per magnetic recording medium.

As a substrate used for such a magnetic recording medium, an aluminum alloy substrate and a glass substrate are mainly used. Out of these, the glass substrate may have a higher rigidity and smaller thickness compared with the aluminum alloy substrate (see, for example, Japanese Unexamined Patent Application, First Publication No. 2012-142084). As a result, many magnetic recording media can be built in a housing having the same dimensions to save space and increase the capacity, and can be preferably used for the hard disk drive used in the data center or the like.

The magnetic recording medium in the hard disk drive is manufactured by forming a magnetic recording film consisting of a magnetic layer and an orientation control layer and the like on a surface of a disk-shaped substrate having a center hole by a film-forming means such as sputtering, for example.

In manufacturing the magnetic recording medium, a sputtering apparatus is generally used. At the start of an operation, such a sputtering apparatus performs a trial run until the operation becomes stable after mounting a target, mounting a shield, adjusting a vacuum pump, and the like. At the time of such a trial run, instead of using a new substrate, a dummy substrate recycled from a non-standard magnetic recording medium that does not meet a predetermined standard is used to reduce the manufacturing cost of the magnetic recording medium (see, for example, Japanese Unexamined Patent Application, First Publication No. 2011-049432).

SUMMARY OF THE INVENTION

For a dummy substrate, a substrate made of the same material as the substrate used for a magnetic recording medium for a product is generally used, but in the case of using a glass substrate, the cost is higher compared with an aluminum alloy substrate. Therefore, there is a problem in that the manufacturing cost of a magnetic recording medium using the glass substrate is increased due to the cost associated with the dummy substrate made of glass that does not become a product.

Furthermore, among the manufactured magnetic recording media, there are some rejected products that do not meet a predetermined quality standard, but the cost due to loss of the rejected magnetic recording media using high-cost glass substrates is also a cause of increasing the manufacturing cost of the magnetic recording media using the glass substrates.

The present disclosure has been made in view of the above-mentioned situation, and an aspect of the present disclosure is to provide a dummy substrate capable of effectively utilizing a rejected product of a magnetic recording medium using a glass substrate to reduce the manufacturing cost of the magnetic recording medium using the glass substrate, and a manufacturing method thereof.

In order to solve the above problems, in the first aspect of the present disclosure, a dummy substrate includes a disk-shaped glass substrate having a center hole, and a magnetic recording film formed on an outer circumferential surface along a thickness direction of the glass substrate and an inner circumferential surface of the center hole, in which a surface roughness (Ra) of one surface and the other surface of the glass substrate is in a range of 0.2 nm or more and 100 nm or less.

Furthermore, in the present disclosure, in each of an outer edge portion of the glass substrate and an inner edge portion of the center hole, an inclined surface is formed which is inclined such that a thickness of the glass substrate from one surface and the other surface of the glass substrate toward the outer circumferential surface and the inner circumferential surface is gradually decreased, and the magnetic recording film may be further formed on the inclined surface.

Furthermore, in the present disclosure, the magnetic recording film may be a laminated film including at least a soft magnetic layer containing a soft magnetic material, a vertical magnetic layer whose axis of easy magnetization is along a film thickness direction of the magnetic recording film, and an orientation control layer that controls an orientation of the vertical magnetic layer.

In the second aspect of the present disclosure, a manufacturing method of the dummy substrate, as a manufacturing method of the dummy substrate according to the above aspects, includes a removal step of removing the magnetic recording film formed on one surface and the other surface of the glass substrate using a magnetic recording disk having the magnetic recording film covering the entire surface of the glass substrate.

Furthermore, in the present disclosure, the removal step may be a step of polishing one surface and the other surface of the magnetic recording disk with a polishing pad or a polishing brush while flowing a polishing liquid toward the magnetic recording disk.

Furthermore, in the present disclosure, the polishing liquid may be obtained by dispersing an aluminum oxide abrasive having an average particle diameter in a range of 0.4 μm or more and 0.8 μm or less in a liquid medium.

Furthermore, in the present disclosure, a magnetic recording disk that does not meet a predetermined standard during a glide and certification test thereof may be used in the removal step.

According to the present disclosure, a rejected product of a magnetic recording medium using a glass substrate can be effectively used, thereby providing a dummy substrate capable of reducing the manufacturing cost of the magnetic recording medium using the glass substrate, and a manufacturing method thereof.

BRIEF DESCRIPTION OF THE DRAWINGS

FIGS. 3(a) to 3(f) are schematic views showing an outline of a manufacturing method of a dummy substrate according to an embodiment of the present disclosure.

DETAILED DESCRIPTION OF THE INVENTION

In the following, a dummy substrate according to an embodiment of the present disclosure and a manufacturing method thereof will be described with reference to the drawings. Further, each embodiment shown below will be specifically described for a better understanding of the gist of the invention, and does not limit the present disclosure unless otherwise specified. In addition, the drawings used for the following description may show portions that are main parts in an enlarged scale for convenience in order to facilitate an understanding of features of the present disclosure, and dimensional ratios and the like of the respective elements are not necessarily the same as the actual ones.

Dummy Substrate

Figure 1:
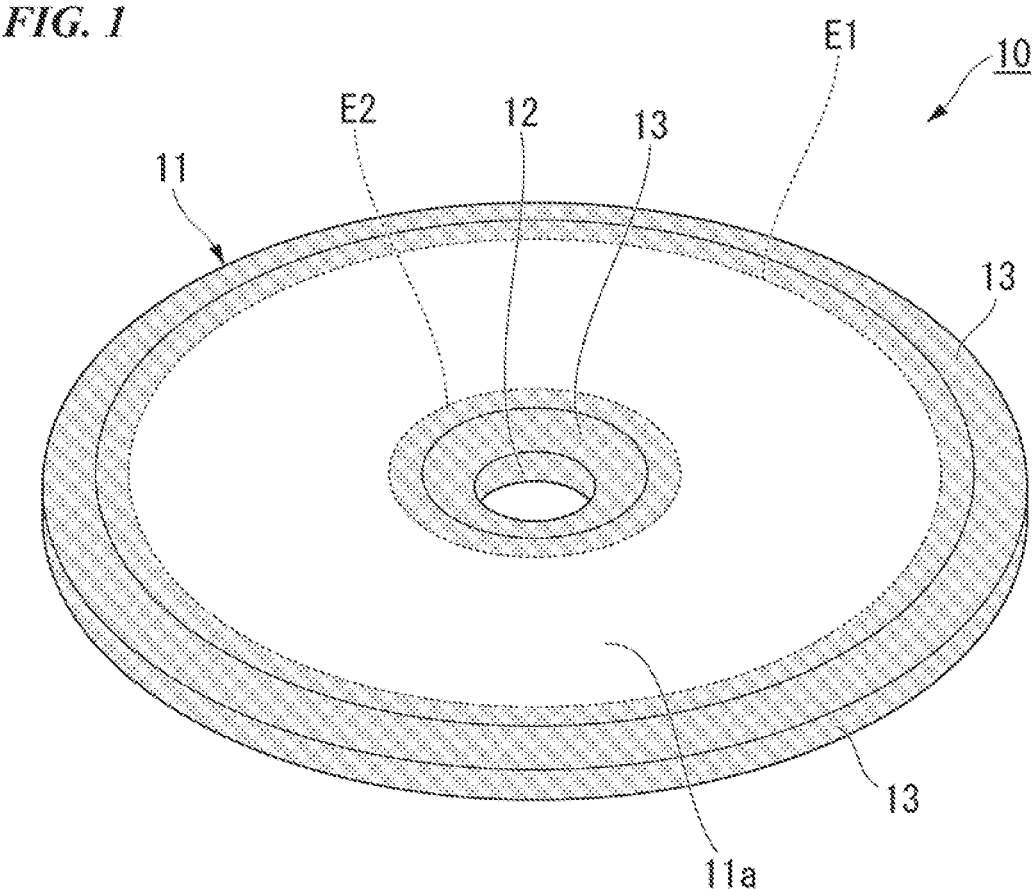
FIG. 1 is an external perspective view showing a dummy substrate according to an embodiment of the present disclosure.
Figure 2:
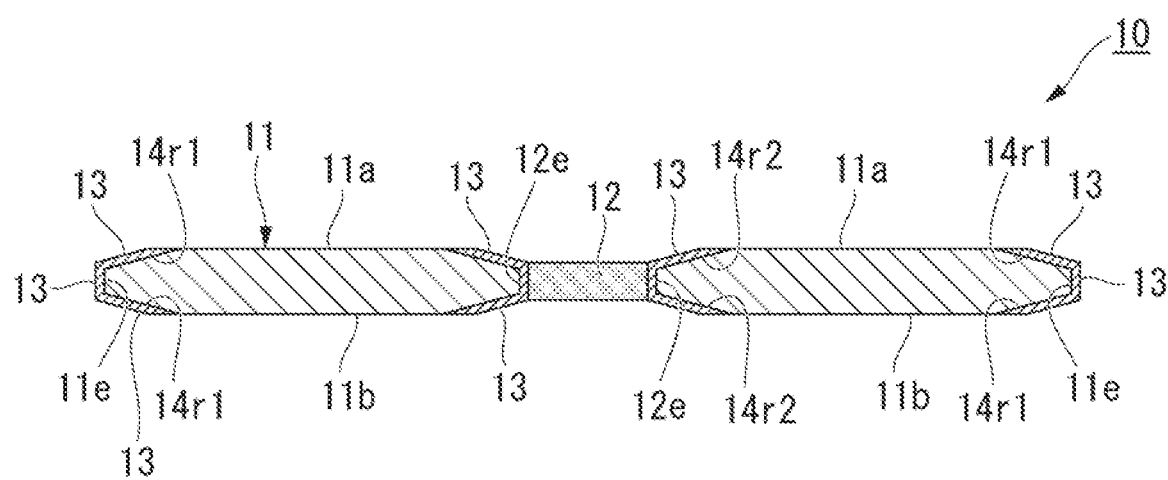
FIG. 2 is an enlarged cross-sectional view of a main part showing a dummy substrate according to an embodiment of the present disclosure.

FIG. 1 is an external perspective view showing a dummy substrate according to an embodiment of the present disclosure. Furthermore, FIG. 2 is an enlarged cross-sectional view of a main part showing a dummy substrate according to an embodiment of the present disclosure.

A dummy substrate 10 of the present embodiment has a glass substrate 11 having a disk shape as a whole and a circular center hole 12 formed in a central portion, and a magnetic recording film 13 formed on at least an outer circumferential surface 11e along a thickness direction of the glass substrate 11 and an inner circumferential surface 12e of the center hole 12. Moreover, in the present embodiment, the magnetic recording film 13 is also formed on inclined surfaces 14r1 and 14r2 each formed on an outer edge portion E1 of the glass substrate 11 and the inner circumferential surface 12e of the center hole 12.

The glass substrate 11 is formed with inclined surfaces (chamfered surfaces) 14r1 and 14r1 each inclined so as to gradually decrease a thickness of the glass substrate 11 from one surface 11a (front main surface) and the other surface (rear main surface) 11b of the glass substrate 11 toward the outer circumferential surface 11e on the outer edge portion E1, which is a region having a predetermined width from the outer edge toward the center. Further, in the present embodiment, the outer edge portion E1 may be a region in which the inclined surfaces 14r1 and 14r1 are formed. In addition, the one surface 11a (front main surface) and the other surface (rear main surface) 11b of the glass substrate 11 are portions where a glass material constituting the glass substrate 11 is exposed without forming the magnetic recording film 13, on the dummy substrate 10.

In addition, the glass substrate 11 is formed with inclined surfaces (chamfered surfaces) 14r2 and 14r2 each inclined so as to gradually decrease the thickness of the glass substrate 11 from the one surface 11a (front main surface) and the other surface (rear main surface) 11b of the glass substrate 11 toward the inner circumferential surface 12e on an inner edge portion E2, which is a region having a predetermined width from the center hole 12 toward the outer edge. Further, in the present embodiment, the inner edge portion E2 need only be a region in which the inclined surfaces 14r2 and 14r2 are formed.

Such inclined surfaces (chamfered surfaces) 14r1 and 14r2 are formed by performing chamfering processing at corners of an outer circumferential edge of a glass base plate sliced into a disk shape from a cylindrical glass block and corners of an inner circumferential edge of the center hole, thereby preventing cracks and chips from occurring at the corners of the outer circumferential edge and the inner circumferential edge of the glass base plate.

Then, a surface roughness (Ra) of the one surface 11a (front main surface) and the other surface (rear main surface) 11b of the glass substrate 11, that is, portions where a glass material constituting the glass substrate 11 is exposed without forming the magnetic recording film 13 on the dummy substrate 10, is in a range of 0.2 nm or more and 100 nm or less.

When the surface roughness (Ra) of the one surface 11a (front main surface) and the other surface (rear main surface) 11b of the glass substrate 11 is less than 0.2 nm, there is a concern that adhesion between the magnetic recording film 13 and the dummy substrate 10 may decrease when forming the magnetic recording film 13 as the dummy substrate 10. On the other hand, when the surface roughness (Ra) of the one surface 11a (front main surface) and the other surface (rear main surface) 11b of the glass substrate 11 exceeds 100 nm, a surface smoothness similar to that of a magnetic recording disk as a product cannot be obtained, thereby causing a problem when used for setting film-forming conditions and the like.

For the glass material constituting the glass substrate 11, for example, general aluminosilicate glass is used. The aluminosilicate glass contains, for example, 58% to 75% by mass of $SiO_2$, 5% to 23% by mass of $Al_2O_3$, 3% to 10% by mass of $Li_2O$, and 4% to 13% by mass of $Na_2O$ as main components. Further, the glass material is not limited to aluminosilicate glass, and may be any material such as soda lime glass and borosilicate glass.

As a manufacturing method of the glass substrate 11, a molten glass material is cast into a preheated cylindrical mold and slowly cooled to obtain a cylindrical glass block. Subsequently, the glass block is maintained for 1 to 3 hours at a temperature near the glass transition point, and then slowly cooled to perform distortion removal processing. The glass block subjected to the distortion removal processing is sliced into a disk shape and cut out using a core drill with the inner and outer circumferences as concentric circles. Alternatively, the molten glass may be poured into the lower mold, and then press-molded by the upper mold and the lower mold to form a disk shape. In this way, a disk-shaped glass base plate (glass blank material) is molded. The glass base plate may be formed by cutting out a sheet glass (plate glass) formed by a down draw method or a float method.

The magnetic recording films 13 each formed on the outer circumferential surface 11e, the inner circumferential surface 12e, and the inclined surfaces 14r1 and 14r2 of the glass substrate 11 have the same configuration as a magnetic recording film of the magnetic recording medium (magnetic recording disk) used as a product. For example, the magnetic recording film 13 is a laminated film including an adhesion layer, a soft magnetic base layer, a seed layer, an orientation control layer, a magnetic layer, a protective layer, a lubricant layer, and the like, which are stacked in order from a surface of the glass substrate 11 that is a non-magnetic substrate. Further, the adhesion layer, the soft magnetic base layer, the seed layer, and the orientation control layer are provided as needed, and some or all of them may not be provided.

Then, the dummy substrate 10 of the present embodiment is formed by forming the magnetic recording film 13 so as to cover the entire surface of the glass substrate 11 to obtain a magnetic recording medium (magnetic recording disk), and then removing the magnetic recording film 13 formed on the one surface 11a of the glass substrate 11 excluding the inclined surface 14r1 and the other surface 11b excluding the inclined surface 14r2.

Further, for the magnetic recording medium (magnetic recording disk) for manufacturing the dummy substrate 10 of the present embodiment, a rejected product that does not meet a predetermined standard during a product inspection step of the magnetic recording medium, for example, a glide test and a certification test, is used. A manufacturing method of the dummy substrate 10 will be described in detail later.

The dummy substrate 10 having the above configuration is used, for example, as a dummy substrate set during a trial run of a sputtering apparatus used in manufacturing a magnetic recording medium (magnetic recording disk) as a product.

Manufacturing Method of Dummy Substrate

Next, a manufacturing method of a dummy substrate having the above-described configuration will be described.

Figure 4A:
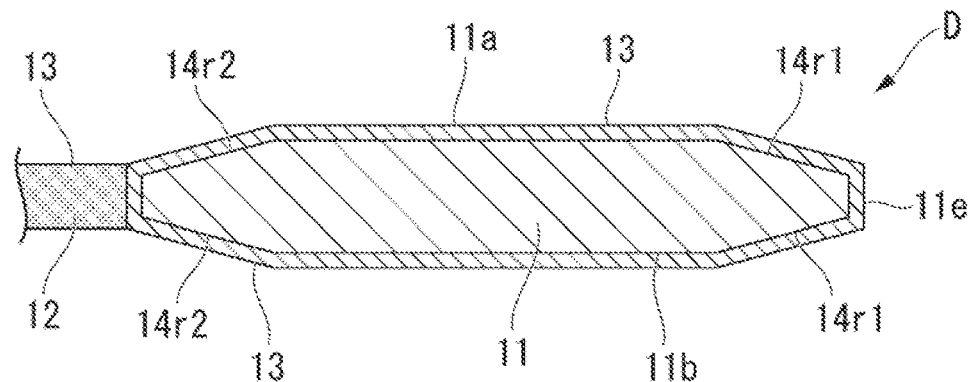
FIGS. 4(a) to 4(b) are enlarged cross-sectional views of a main part showing a magnetic recording disk as a product (FIG. 4(a)) and a removal step of the present embodiment (FIG. 4(b)).
Figure 4B:
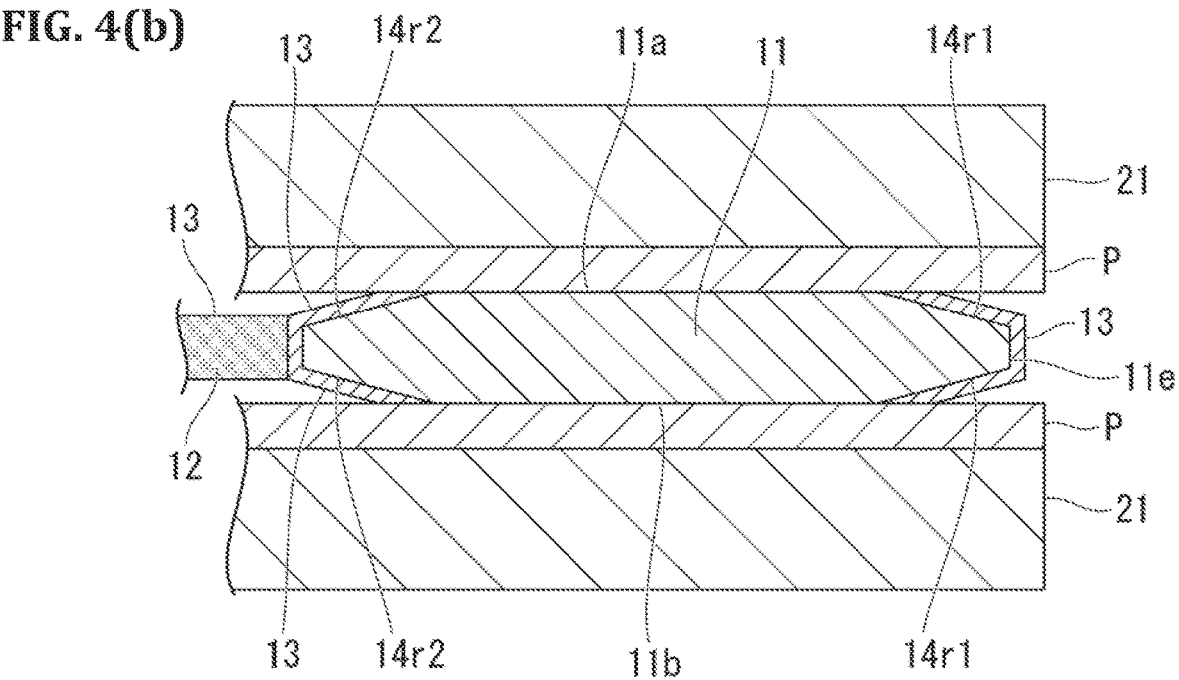

FIGS. 3(a) to 3(f) are schematic views showing an outline of a manufacturing method of the dummy substrate of the present embodiment. In addition, FIGS. 4(a) and 4(b) are enlarged cross-sectional views of a main part showing a magnetic recording disk as a product (FIG. 4(a)) and a removal step of the present embodiment (FIG. 4(b)). Note that FIGS. 4(a) and 4(b) show enlarged views of about a half of the magnetic recording disk in the diameter direction.

The manufacturing method of the dummy substrate of the present disclosure has at least a removal step of removing the magnetic recording film 13 in a portion formed on the one surface 11a and the other surface 11b of the glass substrate 11 from the magnetic recording film 13 covering the glass substrate 11 of a magnetic recording disk D in which the magnetic recording film 13 is formed so as to cover the entire surface of the glass substrate 11.

The magnetic recording disk D is manufactured by a known manufacturing method of a magnetic recording disk. That is, the magnetic recording film 13 is formed on the entire surface of the disk-shaped glass substrate 11 on which the center hole 12 and the inclined surfaces (chamfered surfaces) 14r1 and 14r1 are formed, using a film-forming apparatus (see FIG. 4(a)). The magnetic recording film 13 may be, for example, a laminated film in which an adhesion layer, a soft magnetic base layer, a seed layer, an orientation control layer, a magnetic layer, a protective layer, a lubricant layer, and the like are formed in order from a side of the glass substrate 11.

The magnetic recording disk D is inspected to confirm that it has a predetermined performance as a product. An example of such an inspection is a glide and certification test. The glide test is to inspect the smoothness of a surface of the magnetic recording disk D by detecting the presence or absence and size of protrusions on the surface of the magnetic recording disk D with a glide tester. On the other hand, the certification test writes and reads a test signal to the magnetic recording film 13 of the magnetic recording disk D, and detects the presence or absence of an error to inspect whether the recording performance is certified (guaranteed).

Those that do not meet a predetermined standard by such a glide and certification test are separated from a product production line as test-failed products. The magnetic recording disk D as a test-failed product (FIG. 3(a)) has been discarded in the past, but in the present embodiment, the magnetic recording disk D as a test-failed product is used as a manufacturing material for a dummy substrate (FIG. 3(a)). The collected magnetic recording disks D as the test-failed products are sorted according to their thicknesses. For example, the thicknesses are sorted every 2 μm (FIG. 3(b)). Then, when a predetermined number of sheets are accumulated, a plurality of sheets are collectively processed in a removal step described later.

In the removal step, for example, the magnetic recording disk D that has failed the glide and certification test is set in a disk-polishing apparatus (FIG. 3(c)). Then, the magnetic recording disk D is interposed between a pair of polishing pads P supported by a platen 21, for example, while flowing a polishing liquid toward the magnetic recording disk D, and a side of the one surface 11a and a side of the other surface 11b of the glass substrate 11 are polished (see FIG. 4(b)).

For the polishing liquid used in the removal step, for example, a slurry in which an aluminum oxide abrasive is dispersed in a liquid medium can be used. For the aluminum oxide abrasive, any irregular aluminum oxide particles having corners, and an average particle diameter of, for example, about 0.4 to 0.8 μm may be used. Further, the polishing liquid is not limited to the one described above, and may be any component as long as the magnetic recording film 13 can be scraped off.

Furthermore, for the polishing pads P used in the removal step, for example, a non-woven fabric made of ester-based polyurethane may be used.

Further, in addition to the polishing pads P, for example, a polishing brush or the like can be used to remove the magnetic recording film 13. In a case where a polishing body capable of physically scraping off the surface of the magnetic recording film 13 is used, a washing coolant such as water may be simply flowed without using the polishing liquid.

In the removal step, the magnetic recording disk D is interposed therebetween to polish the one surface 11a and the other surface 11b, thereby removing the magnetic recording film 13 formed on the one surface 11a and the other surface 11b of the glass substrate 11 from the magnetic recording film 13 covering the entire magnetic recording disk D.

That is, the magnetic recording film 13 formed on the one surface 11a and the other surface 11b of the glass substrate 11 is scraped off to expose the glass substrate 11 by pressing the polishing pads P in parallel with the one surface 11a and the other surface 11b of the glass substrate 11 to polish until a thickness of the magnetic recording disk D is decreased by a predetermined amount.

Moreover, on the other hand, the magnetic recording film 13 formed on the outer edge portion E1 and the inner edge portion E2 of the glass substrate 11 (see FIG. 1) and the inclined surfaces (chamfered surfaces) 14r1 and 14r2 connected thereto does not come into contact with the polishing pads P, and the magnetic recording film 13 is left without being scraped off.

Thereafter, the magnetic recording disk is rubbed with a brush using a scrub, and then washed with a rinsing solution, and dried by spin drying (washing and drying step: FIG. 3(d)), and further visually inspected (visual inspection step: FIG. 3(e)) to obtain the dummy substrate 10 of the present embodiment (see FIG. 2). A predetermined number of sheets of manufactured dummy substrates 10 are collected and shipped to a manufacturing factory of the magnetic recording disk D (FIG. 3(f)).

The dummy substrate 10 obtained as described above can be used as a dummy substrate used during a trial run for stabilizing the operation of a film-forming apparatus such as a sputter apparatus.

Thus, the dummy substrate 10 of the present embodiment can be manufactured only by scraping off part of the magnetic recording film 13 of the magnetic recording disk D as a test-failed product that has been discarded in the past so as to be provided at a lower cost as compared with a newly manufactured dummy glass substrate. Furthermore, it contributes to reducing the cost associated with disposal of the magnetic recording disk D as a test-failed product.

Further, the dummy substrate 10 of the present embodiment can be used again as the dummy substrate 10 by forming a magnetic recording film for monitoring film-forming conditions, and then removing the magnetic recording film 13 formed on the one surface 11a and the other surface 11b of the glass substrate 11 again in the removal step. In this way, the cost associated with the dummy substrate can be significantly reduced by recycling as the dummy substrate 10 repeatedly two or more times.

While preferred embodiments of the invention have been described and illustrated above, it should be understood that these are exemplary of the invention and are not to be considered as limiting. Additions, omissions, substitutions, and other modifications can be made without departing from the scope of the invention. Accordingly, the invention is not to be considered as being limited by the foregoing description and is only limited by the scope of the appended claims.

EXAMPLE

As an example of the present disclosure, various characteristics were verified in cases where magnetic recording films were formed, each using the dummy substrate of the above-described embodiment and a commercially available ready-made glass substrate (dummy substrate).

A dummy substrate of an example of the present disclosure (example of the present disclosure): A thickness of the glass substrate was 0.798 mm, a thickness of the magnetic recording film formed on the outer edge portion, the inner edge portion, and the inclined surface was 59.4 nm, and a diameter of the dummy substrate was 65.06 mm.

A commercially available glass substrate of a comparative example (comparative example): A thickness of the glass substrate was 0.80 mm, and a diameter of the dummy substrate was 65.07 mm.

Maintenance of a carrier transport mechanism was performed, using each of the dummy substrate of the above-mentioned example of the present disclosure and the glass substrate of the comparative example, after mounting a target, mounting a shield, and maintaining a vacuum pump using a sputtering apparatus (ML3040: manufactured by Canon Anelva Corporation).

As a result, it was confirmed that the dummy substrate of the example of the present disclosure can be also applied to the maintenance of a carrier transport mechanism of a sputtering apparatus without any problem as a commercially available glass substrate (comparative example).

Next, the surface roughness of each of the dummy substrate (an exposed glass portion before film formation) of the example of the present disclosure and the dummy substrate (before film formation) of the comparative example was measured. An atomic force microscope (manufactured by Bruker) was used for the measurement. The measurement results (multiple measurements) of the surface roughness of the dummy substrate of the example of the present disclosure and the dummy substrate of the comparative example are as follows.

The example of the present disclosure: (Ra) 0.465 nm to 0.703 nm

The comparative example: (Ra) 0.21 nm

From the above results, it was observed that the surface roughness of the dummy substrate of the example of the present disclosure and the dummy substrate of the comparative example did not change significantly. The surface roughness of the dummy substrate of the example of the present disclosure was in a range of 0.2 nm or more and 100 nm or less.

What is claimed is:

1. A method for manufacturing a dummy substrate, the method comprising:
    a removal step of removing a magnetic recording film formed on a front main surface and a rear main surface of a disk-shaped glass substrate using a magnetic recording disk having the magnetic recording film covering the entire surface of the glass substrate to obtain the dummy substrate,
    wherein the dummy substrate comprises:
    the disk-shaped glass substrate having a center hole; and
    the magnetic recording film formed on an outer circumferential surface along a thickness direction of the glass substrate and an inner circumferential surface of the center hole, wherein a surface roughness (Ra) of the front main surface and the rear main surface of the glass substrate is in a range of 0.2 nm or more and 100 nm or less.

2. A method for manufacturing the dummy substrate according to claim 1,
    wherein, in each of an outer edge portion of the glass substrate and an inner edge portion of the center hole, an inclined surface is formed which is inclined such that a thickness of the glass substrate from the front main surface and the rear main surface of the glass substrate toward the outer circumferential surface and the inner circumferential surface is gradually decreased, and
    the magnetic recording film is further formed on the inclined surface.

3. The method for manufacturing the dummy substrate according to claim 2, wherein
    the removal step is a step of polishing the front main surface and the rear main surface of the magnetic recording disk with a polishing pad or a polishing brush while flowing a polishing liquid toward the magnetic recording disk.

4. The method for manufacturing the dummy substrate according to claim 3, wherein the polishing liquid is obtained by dispersing an aluminum oxide abrasive having an average particle diameter in a range of 0.4 μm or more and 0.8 μm or less in a liquid medium.

5. The method for manufacturing the dummy substrate according to claim 4, wherein
the magnetic recording disk that does not meet a predetermined standard during a glide and certification test thereof is used for the magnetic recording disk used in the removal step.

6. The method for manufacturing the dummy substrate according to claim 3, wherein
the magnetic recording disk that does not meet a predetermined standard during a glide and certification test thereof is used for the magnetic recording disk used in the removal step.

7. A method for manufacturing the dummy substrate according to claim 1,
wherein the magnetic recording film is a laminated film including at least a soft magnetic layer containing a soft magnetic material, a vertical magnetic layer whose axis of easy magnetization is along a film thickness direction of the magnetic recording film, and an orientation control layer that controls an orientation of the vertical magnetic layer.

8. The method for manufacturing the dummy substrate according to claim 7, wherein
the removal step is a step of polishing the front main surface and the rear main surface of the magnetic recording disk with a polishing pad or a polishing brush while flowing a polishing liquid toward the magnetic recording disk.

9. The method for manufacturing the dummy substrate according to claim 8, wherein
the polishing liquid is obtained by dispersing an aluminum oxide abrasive having an average particle diameter in a range of 0.4 μm or more and 0.8 μm or less in a liquid medium.

10. The method for manufacturing the dummy substrate according to claim 9, wherein
the magnetic recording disk that does not meet a predetermined standard during a glide and certification test thereof is used for the magnetic recording disk used in the removal step.

11. The method for manufacturing the dummy substrate according to claim 8, wherein
the magnetic recording disk that does not meet a predetermined standard during a glide and certification test thereof is used for the magnetic recording disk used in the removal step.

12. The method for manufacturing the dummy substrate according to claim 1, wherein the removal step is a step of polishing the front main surface and the rear main surface of the magnetic recording disk with a polishing pad or a polishing brush while flowing a polishing liquid toward the magnetic recording disk.

13. The method for manufacturing the dummy substrate according to claim 12, wherein
the polishing liquid is obtained by dispersing an aluminum oxide abrasive having an average particle diameter in a range of 0.4 μm or more and 0.8 μm or less in a liquid medium.

14. The method for manufacturing the dummy substrate according to claim 13, wherein
the magnetic recording disk that does not meet a predetermined standard during a glide and certification test thereof is used for the magnetic recording disk used in the removal step.

15. The method for manufacturing the dummy substrate according to claim 12, wherein
the magnetic recording disk that does not meet a predetermined standard during a glide and certification test thereof is used in the removal step.

* * * * *